UNITED STATES PATENT OFFICE.

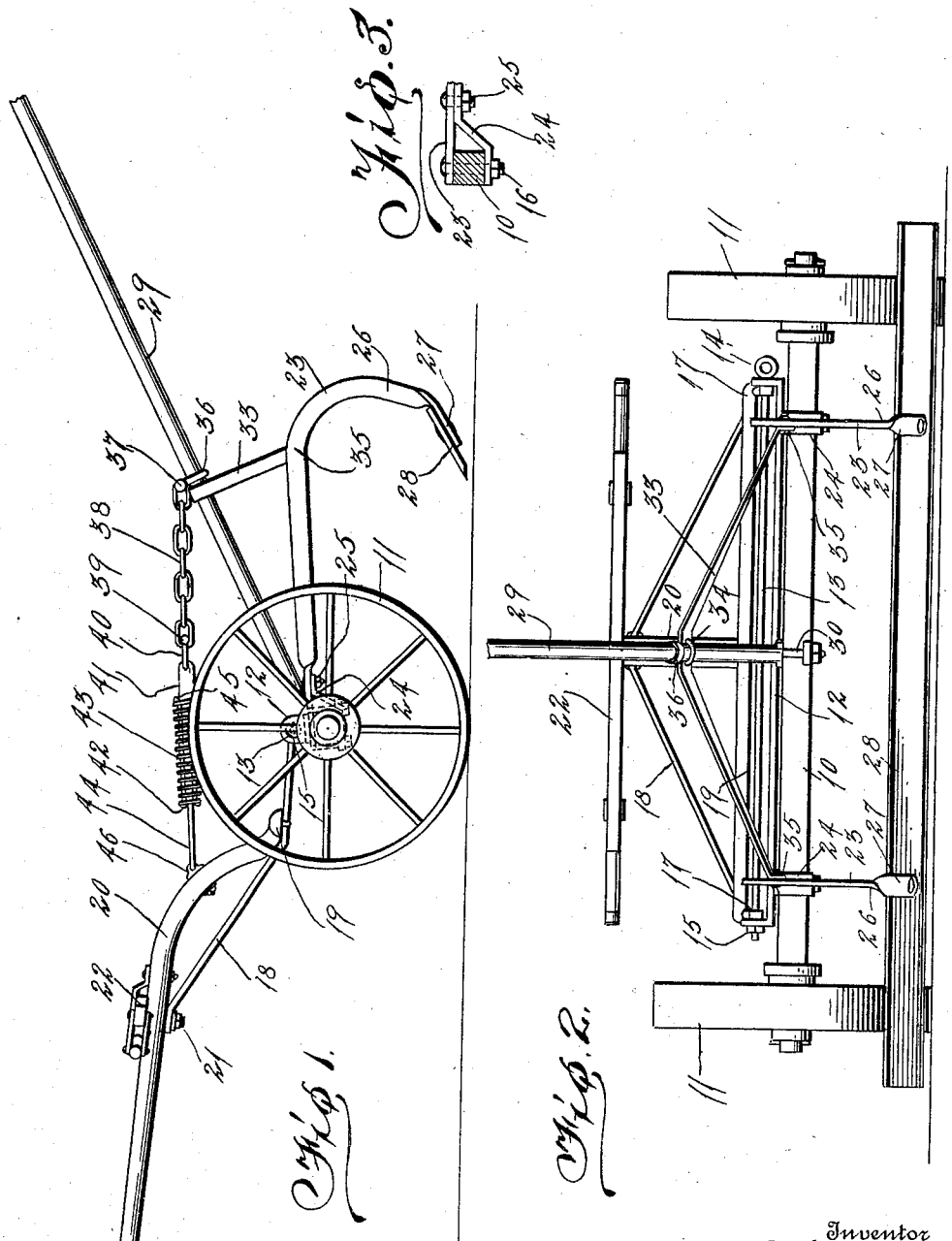

BENJAMIN L. NEHF, OF DINUBA, CALIFORNIA.

CULTIVATOR.

977,031.  Specification of Letters Patent.  Patented Nov. 29, 1910.

Application filed June 27, 1910. Serial No. 569,073.

*To all whom it may concern:*

Be it known that I, BENJAMIN L. NEHF, a citizen of the United States, residing at Dinuba, in the county of Tulare, State of California, have invented certain new and useful Improvements in Cultivators; and I do hereby declare the following to be a full, clear, and exact description of the invention, such as will enable others skilled in the art to which it appertains to make and use the same.

This invention relates to cultivators and has for an object to provide a cultivator for removing weeds between rows of trees or vines, that can be more easily manipulated in close corners than usual by virtue of its novel blade mounting, and will be formed of a few strong and durable parts that will not easily get out of order.

With these and other objects in view, the invention consists of the novel details of construction and combination of parts hereinafter fully described and claimed it being understood that various modifications may be made in the minor details of construction within the scope of the appended claim.

In the accompanying drawings forming part of this specification: Figure 1 is a side elevation of a cultivator constructed in accordance with my invention. Fig. 2 is a rear elevation of the cultivator. Fig. 3 is a fragmental sectional view taken on the line 5—5 Fig. 3.

The reference character 10 designates an axle which is preferably square in outline and is provided at its opposite extremities with ordinary spindles upon which is mounted supporting wheels 11 of ordinary construction. Fixed to the top face of the axle is a U shaped strip 12, the upright legs of this strip being arranged adjacent the spindles of the axle and provided adjacent their extremities with suitable openings for the reception of a pin 13, this pin having an eye 14 at one end forming means for manually removing the pin and being equipped at its opposite end with a retaining nut 15, said eye and nut bearing against the outer faces of the legs as shown. The shoulder of the strip is bolted to the axle as shown at 16, the same bolts performing the further function of securing the cultivator beams in position as will hereinafter appear. Loosely fitted on the pin 12 are the terminal eyes 17 of a V shaped hound 18, the legs of this hound being formed substantially straight next adjacent the terminal eyes to form seats to which is fixed the cross bar 19 of a pole 20, the king bolt 21 which secures a double-tree 22 to the pole engaging the shoulder of the V shaped hound, thus coöperating with the cross bar to form a rigid connection between the pole and hound. It might here be stated that the pole, through the instrumentality of the hound eyes, is swivelly mounted upon the pin 12.

A pair of L shaped beams 23 are provided at their forward ends with suitable openings to receive the shanks of the before mentioned bolts 16 which secure the U shaped strip to the axle. These beams are each given a half twist a short distance from the axle. A brace bar 24 is bolted at one end as shown at 25 to the straight portion of each beam adjacent to the axle and at its opposite end is provided with an opening to receive that portion of the shank of the securing bolt 16 which projects below the bottom face of the axle. Thus the bars 23 are braced at their juncture with the axle and a rigid connection formed between the rods and the axle.

The extremities 26 of the L shaped beams project downwardly and are formed with a twist adjacent their lower ends, these twists forming substantially flat seats 27 to which is bolted a blade 28. The blade 28 is formed from a single narrow plate of metal which is sufficient in length to extend considerably beyond the supporting wheels and is adapted at its lower edge to penetrate the ground and uproot weeds and the like. It might here be stated that the blades are rigidly secured to the bars and the bars are rigidly secured to the axles.

A handle lever 29 is provided, this handle lever being formed from a single length of pipe, one end of which is flattened and is provided with a pair of suitable openings through which the legs of a clevis 30 pass. The extremities of the legs pass through apertured lugs 31 formed on the sides of the axle and are equipped with nuts 32 which prevent their withdrawal. A V shaped hanger bar 33 is bolted at its apex as shown at 34 to the handle lever and has the extremities of its legs bolted as shown at 35 to the blade supporting bars 23. The handle lever inclines outwardly at an angle of about 30 degrees from a horizontal plane. It is now evident that the handle lever is rigidly fixed to the blade supporting bars and also the axle.

Mounted on the handle lever adjacent to the apex of the V shaped brace bar is a clevis 36, this clevis bearing with its shoulder against the under side of the handle lever and having its transverse bolt 37 arranged above the top face of the handle lever. To the transverse bolt of the clevis is secured one end of a link chain 38, the opposite end of this link chain engaging the transverse bolt of a clevis 40. A rod 41 is provided at its opposite ends with hooked extremities 42, one of these hooks engaging the transverse bolt 39 of the last named clevis and the other hook engaging one terminal convolution of a helical spring 43, this spring being seated upon the bar intermediate the hooked extremities of the latter. A rod 44 is provided at its opposite ends with hooked extremities 45, one of these extremities engaging a suitable eye 46 fixed to the pole and the opposite extremity engaging the other terminal convolution of the helical spring, that portion of the rod intermediate its hooked extremities extending lengthwise through the spring. The function of the helical spring is to yieldingly hold the blade raised from the ground when the pole is hooked to the draft animals. It is now evident that since the pole is pivoted to the axle and the handle lever and blade are fixed to the axle that the operator may depress the handle lever, thereby contracting the spring without causing any movement whatever of the pole, and that as long as the operator continues to depress the handle lever, the blade will penetrate into the ground, but as soon as the handle lever is released the helical spring will expand to its initial position and automatically elevate the blade from the ground.

It is clear that the handle lever may be rotated to a substantially vertical position when it is desired to turn a corner in close quarters without displacing the supporting wheels or pole from their relative positions, since both the supporting wheels and poles are loosely secured to the axle.

What is claimed is:—

A cultivator comprising an axle, a U-shaped member having an intermediate portion fixed to said axle and having up-standing spaced legs arranged adjacent to the spindles of said axle and provided with alining orifices, a pin passed through said orifices and disposed approximately in parallelism with said axle, a draft tongue having a branched attaching iron provided with terminal eyes encircling said pin, whereby the draft pole may rock in a perpendicular plane relatively to the axle, a pair of spaced beams fixed at their forward ends to said axle and having down curved rear ends, a single blade carried by said down curved ends, an inclined handle bar arranged intermediate said beams, an inverted V-shaped brace element terminally connected to said beams and having its apex secured to said handle bar and operating to maintain said handle bar and said beams in a constant fixed relation.

In testimony whereof, I affix my signature, in presence of two witnesses.

BENJAMIN L. NEHF.

Witnesses:
W. WHITTINGTON,
J. SIFERS.